(12) United States Patent
Yamamoto (10) Patent No.: US 11,343,869 B2
(45) Date of Patent: May 24, 2022

(54) COMMUNICATION APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Tetsuya Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 16/746,677

(22) Filed: Jan. 17, 2020

(65) Prior Publication Data

US 2020/0245391 A1 Jul. 30, 2020

(30) Foreign Application Priority Data

Jan. 28, 2019 (JP) .............................. JP2019-011906

(51) Int. Cl.
*H04W 76/16* (2018.01)
*H04W 76/34* (2018.01)
*H04W 88/06* (2009.01)

(52) U.S. Cl.
CPC ........... *H04W 76/16* (2018.02); *H04W 76/34* (2018.02); *H04W 88/06* (2013.01)

(58) Field of Classification Search
CPC ..... H04W 76/16; H04W 76/34; H04W 88/06; H04W 76/15
See application file for complete search history.

(56) References Cited

U.S. PATENT DOCUMENTS

| 6,856,254 B1* | 2/2005 | Tanaka ................ H04L 12/2803 340/687 |
| 2011/0234880 A1* | 9/2011 | Matsuda .......... H04N 5/232941 348/333.04 |
| 2018/0116008 A1* | 4/2018 | Kawasaki ............. H04W 40/34 |
| 2018/0288637 A1* | 10/2018 | Laselva ................ H04W 24/10 |
| 2019/0075604 A1* | 3/2019 | Wang .................... H04W 76/15 |
| 2019/0230515 A1* | 7/2019 | Quan ................... H04B 17/327 |
| 2020/0068414 A1* | 2/2020 | Karimli ................ H04J 3/0647 |
| 2020/0068586 A1* | 2/2020 | Kato ................. H04W 72/0453 |
| 2020/0260287 A1* | 8/2020 | Hendel .................... G06F 21/74 |

FOREIGN PATENT DOCUMENTS

JP    2016-127383 A    7/2016

\* cited by examiner

*Primary Examiner* — Will W Lin (74) *Attorney, Agent, or Firm* — Canon U.S.A., Inc. I.P. Division

(57) ABSTRACT

A communication apparatus includes a communication unit configured to perform in parallel a first communication using a first wireless communication method conforming to 3rd generation partnership project (3GPP) standard and a second communication using a second wireless communication method conforming to the 3GPP standard, an acquisition unit configured to acquire a radio wave state in at least one of the first communication and the second communication while the communication unit performs in parallel the first communication and the second communication, and a notification unit configured to output to a user a warning in a case where the first communication and the second communication are not performable in parallel due to the radio wave state.

20 Claims, 7 Drawing Sheets

COMMUNICATION APPARATUS, CONTROL METHOD OF COMMUNICATION APPARATUS, AND STORAGE MEDIUM

BACKGROUND

Field

The present disclosure relates to a communication apparatus, a control method of a communication apparatus, and a storage medium.

Description of the Related Art

The 3rd generation partnership project (3GPP) standard specifies dual connectivity that allows parallel communication with a plurality of base stations.

The dual connectivity allows user equipment (UE) to perform parallel communication using component carriers (CCs) provided by the plurality of base stations, so that the UE can increase user throughput (Japanese Patent Application Laid-Open No. 2016-127383).

Specifically, the UE divides one evolved packet system (EPS) bearer or one packet sequence, and transmits in parallel the divided packet sequences to the CCs provided by the plurality of base stations.

More specifically, the UE transmits the divided packet sequences to a master node (MN) base station and a secondary node (SN) base station.

When the divided packet sequences are transmitted, the MN base station or the SN base station reorders the packet sequences received by one of these base stations (the MN base station and the SN base station) and the packet sequences received by the other base station of the base stations. Through this reordering, the base station (the MN base station or the SN base station) reconfigure the packet sequences received from the user equipment.

After the reconfiguration of the packet sequences, the base station transfers the reconfigured packet sequences to a core node (CN).

The 5th generation mobile communication system (5G) also specifies evolved-universal terrestrial radio access (E-UTRA)-new radio (NR) dual connectivity (EN-DC). The EN-DC enables utilization of a dual connectivity (DC) function in a non-standalone mode in which different wireless communication methods (5G and long term evolution (LTE)) are cooperated with each other. The 5G standard is a next generation communication standard, which is currently being formulated in the 3GPP standard. Thus, LTE communication and 5G communication can be executed in parallel, which can improve user throughput and communication reliability. The E-UTRA is a wireless communication technology for LTE. NR is a wireless communication technology for 5G.

In the communication apparatus discussed in Japanese Patent Application Laid-Open No. 2016-127383, a user cannot notice unavailability of a DC communication, in a case where the user of a user equipment (e.g., communication apparatus) using the DC communication moves to outside of a communication range of one base station. Therefore, it may take a long time to investigate a cause of inappropriate execution of the communication application that is based on high-speed communication using the DC communication.

SUMMARY

The present disclosure features usability improvement of the communication apparatus that can communicate with a plurality of base stations using different wireless communication methods in parallel.

According to an aspect of the present disclosure, a communication apparatus includes a communication unit configured to perform in parallel a first communication using a first wireless communication method conforming to 3rd generation partnership project (3GPP) standard and a second communication using a second wireless communication method conforming to the 3GPP standard, an acquisition unit configured to acquire a radio wave state in at least one of the first communication and the second communication while the communication unit performs in parallel the first communication and the second communication, and a notification unit configured to output to a user a warning in a case where the first communication and the second communication are not performable in parallel due to the radio wave state.

Further features of the present disclosure will become apparent from the following description of exemplary embodiments with reference to the attached drawings.

DESCRIPTION OF THE EMBODIMENTS

Some exemplary embodiments of the present disclosure are described in detail below with reference to accompanying drawings. The following exemplary embodiments do not limit the scope of the present disclosure, and all of combinations of features described in the exemplary embodiments are not necessarily essential for solving means of the present disclosure. Configurations in the exemplary embodiments may be appropriately modified or alternated depending on a specification of an apparatus to which the present disclosure is applied and various kinds of conditions (e.g., use conditions and usage environment). The technical scope of the present disclosure is defined by the claims, and is not limited by the following individual exemplary embodiments.

A communication apparatus according to a first exemplary embodiment of the present disclosure is described with reference to FIGS. 1 to 4. In the present exemplary embodiment, a digital camera including a wireless communication function is described as an example of the communication apparatus. The digital camera can perform evolved-universal terrestrial radio access (E-UTRA)-new radio (NR) dual connectivity (EN-DC) communication, which communicates with different base stations in parallel using long term evolution (LTE) and 5th generation mobile communication system (5G). The LTE and 5G are different wireless communication methods in accordance with the 3rd generation partnership project (3GPP) standard.

<Hardware Configuration>

Figure 1:
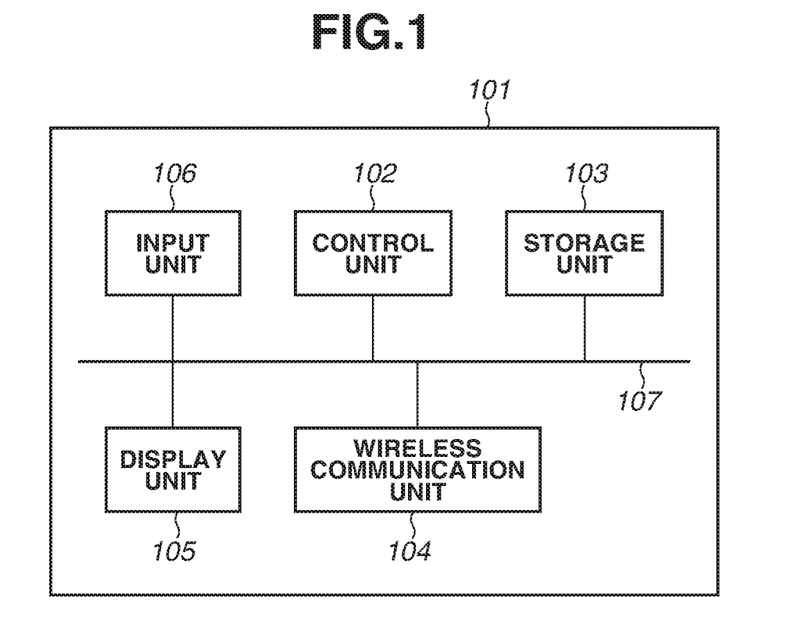
FIG. 1 is a block diagram illustrating a hardware configuration of a communication apparatus according to a first exemplary embodiment of the present disclosure.

FIG. 1 is a block diagram illustrating an exemplary hardware configuration of a digital camera 101 according to the present exemplary embodiment.

The digital camera 101 includes a control unit 102, a storage unit 103, a wireless communication unit 104, a display unit 105, and an input unit 106. The control unit 102, the storage unit 103, the wireless communication unit 104, the display unit 105, and the input unit 106 are connected to one another via a bus 107.

The control unit 102 controls the entire digital camera 101 by executing a control program stored in the storage unit 103. The control unit 102 includes one or more central processing units (CPUs) and processors.

The storage unit 103 stores the control program to be executed by the control unit 102, and various kinds of information, such as a communication parameter, and captured image data (imaging data). Various kinds of operation described below are performed when the control unit 102 executes the control program stored in the storage unit 103. The storage unit 103 includes one or more read-only memories (ROMs) and random access memories (RAMs).

The wireless communication unit 104 performs cellular network communication (e.g., mobile communication) of the LTE and 5G conforming to the 3GPP standard. The wireless communication unit 104 can transmit high definition (HD) real-time moving image. The wireless communication unit 104 can also transmit standard definition (SD) moving image. The LET includes LTE-Advanced and LTE-Advanced Pro methods.

The display unit 105 displays various information (e.g., characters and images). The display unit 105 can notify and output predetermined warning to a user through the display. Further, the display unit 105 includes a liquid crystal display (LCD) and a light-emitting diode (LED), and outputs information that is visually recognizable by the user, through a screen of the LCD and light emission of the LED.

The display unit 105 may further include a speaker, and a vibration unit. The speaker outputs sound that is acoustically recognizable by the user. The vibration unit vibrates at a frequency and an amplitude that are tactually recognizable by the user. In other words, the display unit 105 outputs predetermined information by ways (e.g., characters, images, light, sound, and vibration) recognizable by a person, thus notifying the user of the predetermined information. The display unit 105 is also referred to as an output unit. For example, the display unit 105 may output at least one of visual information and sound information.

The user inputs various kinds of data including numerical values, instructions, and programs to the digital camera 101 using the input unit 106. The input unit 106 includes a keyboard, a mouse, and a touch panel, and accepts the input from the user. The user can operate the digital camera 101 by inputting data or instructions through the input unit 106. For example, the user can change a moving image transmission mode of the digital camera 101 through the input unit 106. The input unit 106 may also referred to as an operation unit.

<Software Function Configuration>

Figure 2:
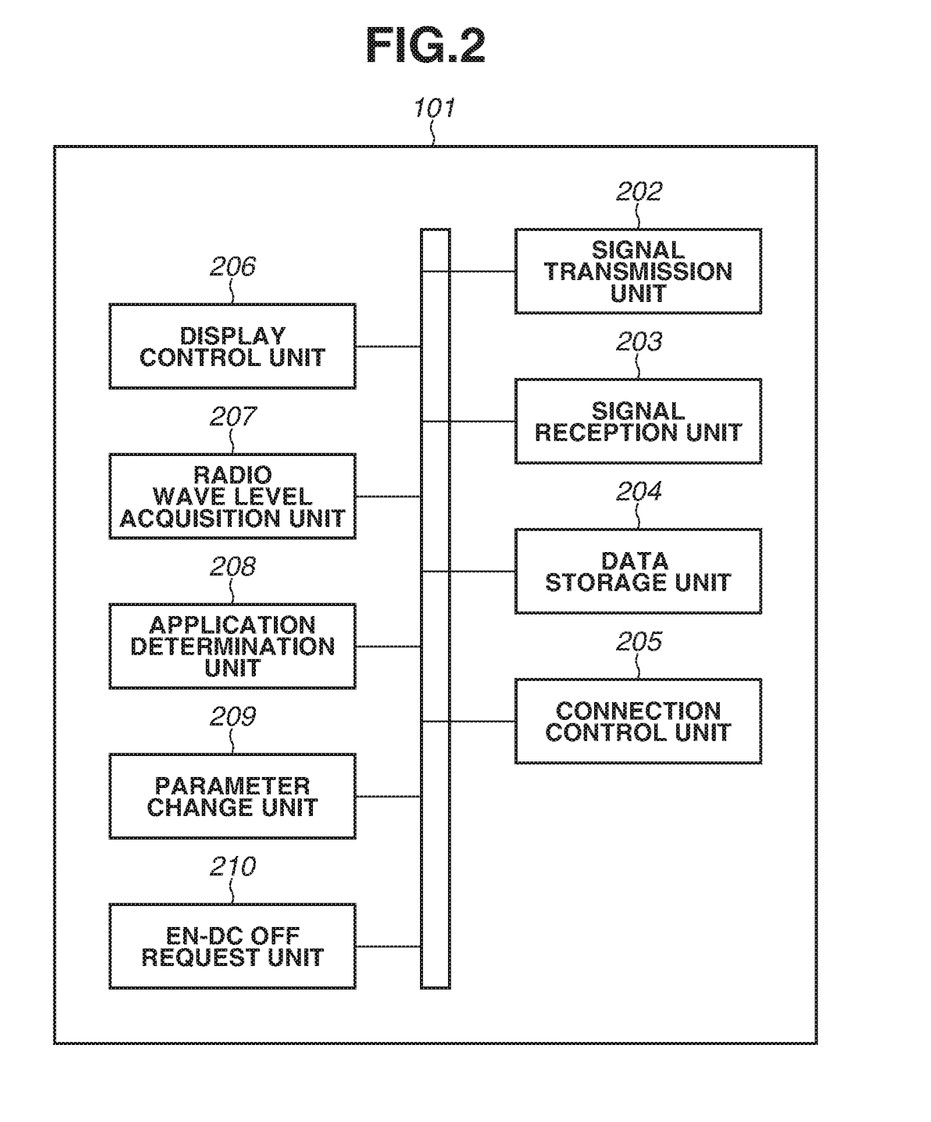
FIG. 2 is a block diagram illustrating software functions of the communication apparatus illustrated in FIG. 1.

FIG. 2 is a block diagram illustrating an exemplary configuration of software functional blocks of the digital camera 101 for executing a communication control function described below.

The digital camera 101 includes, as software functional blocks, a signal transmission unit 202, a signal reception unit 203, a data storage unit 204, a connection control unit 205, a display control unit 206, a radio wave level acquisition unit 207, an application determination unit 208, a parameter change unit 209, and an EN-DC off request unit 210.

The signal transmission unit 202 and the signal reception unit 203 perform the cellular network communication with another external apparatus using the 3GPP conformed LTE and 5G standards.

The data storage unit 204 stores, for example, software and information such as authentication information.

The connection control unit 205 executes processing relating to connection and disconnection with a cellular network base station. The connection control unit 205 can acquire, through the processing, information on whether the digital camera 101 is under an EN-DC communication with the base station.

The connection control unit 205 also executes setting processing, which is performed with the base station, relating to the EN-DC connection. For example, the connection control unit 205 notifies the base station that the digital camera 101 has an EN-DC function, and further notifies the base station of capability information relating to the EN-DC communication. The display control unit 206 executes control and processing of a screen and images to be displayed on the display unit 105. The display control unit 206 and the display unit 105 perform the above-described notification (warning notification to the user).

The radio wave level acquisition unit 207 acquires a radio wave state (e.g., radio wave intensity) of the communication with the base station. The radio wave state may be determined through measurement of a received signal strength indicator (RSSI) or a signal-to-noise ratio (SNR) of the communication with the base station. Other information may be used for the determination.

In the present exemplary embodiment, as radio wave level acquisition processing, for example, the radio wave level acquisition unit 207 may determine, for example, whether a data communication application is under execution, the data communication application being previously determined to essentially require the cellular network communication. More specifically, for example, the radio wave level acquisition unit 207 may determine whether the data communication application that remotely operates the digital camera 101 through the cellular network communication is under execution, and acquire a radio wave level based on a result of the determination. For example, the radio wave level acquisition unit 207 may determine that acquisition of the radio wave level is essential, in a case where the application is under execution. The radio wave level acquisition unit 207 may determine that acquisition of the radio wave level is not essential, in a case where the application is not under execution.

The application determination unit 208 determines the data communication application that is currently under execution by a self-apparatus (e.g., the digital camera 101). For example, the application determination unit 208 determines whether the digital camera 101 has started up and is executing a HD real-time moving image transmission application as the data communication application.

The parameter change unit 209 changes a parameter of the data communication application. For example, the parameter change unit 209 changes the parameter of the data communication application, in a case where a moving image in HD quality is converted into a moving image in SD quality and transmitted.

The EN-DC off request unit 210 transmits, to a core public wireless communication (cellular network communication) network, a signal to request EN-DC off setting and EN-DC on setting, in a network where turning-off of EN-DC can be set and requested.

The configuration of the functional blocks illustrated in FIG. 2 is one example. A plurality of functional units may be integrated to one functional unit, or any of the functional units may be divided into a plurality of functional units. Further, one or more functional units may be configured by hardware (e.g., an application specific integrated circuit (ASIC), which is a circuit having one or more functions).

<Network Configuration>

Figure 3:
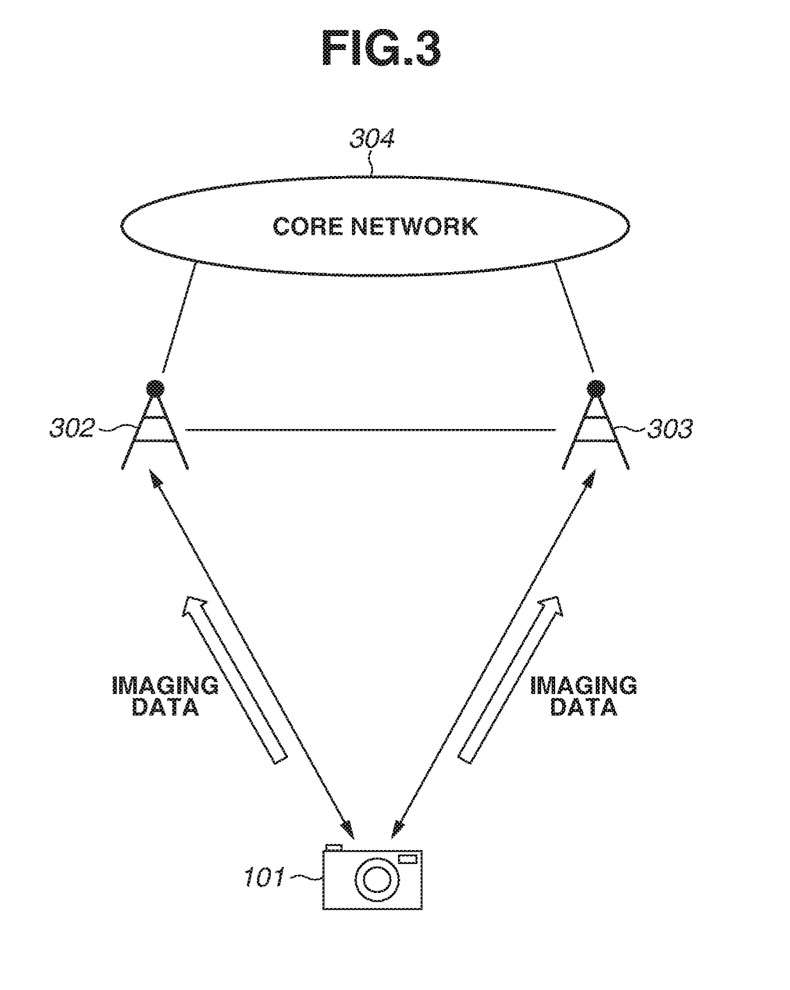
FIG. 3 illustrates an example of a network configuration to which exemplary embodiments of the present disclosure are applied.

FIG. 3 illustrates an example of a network configuration to which the present exemplary embodiment is applied. The network includes the digital camera 101, two base stations 302 and 303, a core network 304, and a network apparatus (server and host station (not illustrated)) connected to the core network 304. The wireless communication methods of the two base stations 302 and 303 are different from each other.

The digital camera 101 supports the EN-DC (can perform EN-DC communication) that communicates, in parallel, with the two base stations 302 and 303 each of which using a different wireless communication method from each other. In the present exemplary embodiment, the digital camera 101 communicates with the base station 302 and the base station 303 in parallel using the EN-DC function to upload the imaging data to the network apparatus (server), and transmits (uploads) the imaging data to the base station 302 and the base station 303. For example, the base station 302 is a base station for the LTE communication, and the base station 303 is a base station for the 5G communication.

The base stations 302 and 303 each transmit the imaging data received from the digital camera 101 to the network apparatus connected to the core network 304.

In the network illustrated in FIG. 3, the base station 302 functions as a master base station (MN), and the base station 303 functions as a secondary base station (SN). In the EN-DC communication, the base station 302 serving as the master base station (hereinafter master base station 302) controls the DC parallel communication between the digital camera 101 and the base stations 302 and 303, and controls communication with the core network 304. The base station 303 serving as the secondary base station (hereinafter secondary base station 303) is an NR base station.

An example of processing to start the EN-DC communication is briefly described. To start the EN-DC communication, the master base station 302 requests the secondary base station 303 to perform DC setting, in response to a signal from the digital camera 101. The master base station 302 that has received a response signal from the secondary base station 303 transmits a setting signal to the digital camera 101. In response to the setting signal, the digital camera 101 transmits completion notification to the master base station 302, to start a procedure to synchronize with the secondary base station 303. After the synchronization procedure is completed, connection with the secondary base station 303 is established. The connection control unit 205 of the digital camera 101 acquires information meaning that the digital camera 101 has transmitted the completion notification to the master base station 302. It is possible to determine whether the digital camera 101 is currently in the EN-DC communication, based on the information.

<Warning Display Processing in EN-DC Communication>

Figure 4:
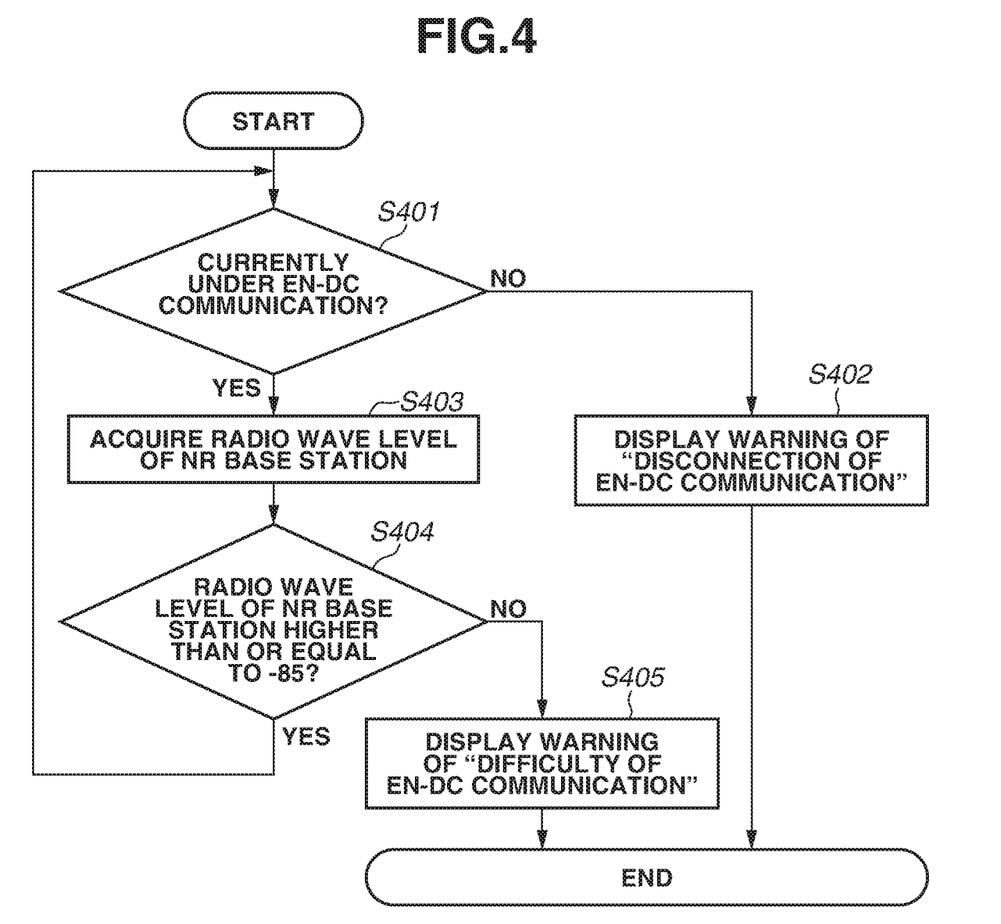
FIG. 4 illustrates an operation flowchart of the communication apparatus according to the first exemplary embodiment of the present disclosure.

FIG. 4 is a flowchart of processing to display warning of EN-DC communication disconnection and EN-DC communication difficulty, executed by the digital camera 101 in the present exemplary embodiment. The flowchart in FIG. 4 is started by the control unit 102 when the digital camera 101 starts the EN-DC communication. The flowchart illustrated in FIG. 4 is executed when the control unit 102 reads out and executes the computer program stored in the storage unit 103.

In step S401, the digital camera 101 determines whether the EN-DC communication is currently being executed, based on the information from the connection control unit 205.

In a case where a result of the determination in step S401 is No (NO in step S401), the processing proceeds to step S402. For example, when the digital camera 101 moves to the outside of the 5G communication range, the determination result in step S401 becomes No. In this case, the EN-DC communication is unavailable.

In step S402, the digital camera 101 displays warning to notify the user of a situation where "EN-DC communication is disconnected", on the display unit 105 via the display control unit 206. The display unit 105 displays, for example, characters saying "High-speed communication is unavailable." as the warning display. The display unit 105 may output warning sound (e.g., alert tone) in step S402.

In a case where the result of the determination in step S401 is Yes (YES in step S401), the processing proceeds to step S403. In step S403, the digital camera 101 acquires a value representing a radio wave state in the currently-connected communication with the NR base station (base station 303) through the radio wave level acquisition unit 207.

In step S404, it is determined whether the value acquired in step S403 is higher than or equal to −85. The value of −85 is an example of a predetermined threshold, and the threshold used in the determination in step S403 is not limited to −85. A unit of the value of −85 is, for example, dBm; however, the unit is not limited thereto. The value representing the radio wave state used in step S404 may be, for example, an RSSI, or a SNR.

In a case where a result of the determination in step S404 is No (e.g., in a case where value representing radio wave state is lower than predetermined threshold), the processing proceeds to step S405. For example, in a case where the digital camera 101 is located at a position immediately before movement to the outside of the 5G communication range, the value representing the radio wave state becomes lower than −85, and the result of the determination in step S404 becomes No. In this case, the EN-DC communication is difficult.

In step S405, the digital camera 101 displays warning to notify the user of a situation where "continuation of EN-DC communication is difficult", on the display unit 105 via the display control unit 206. The display unit 105 displays, for example, characters saying "High-speed communication will possibly be unavailable." as the warning display. The display unit 105 may output warning sound in step S405. In this case, the warning sound output in step S402 and the warning sound output in step S405 are preferably made different from each other to enable the user to distinguish the warning sound.

In a case where the result of the determination in step S404 is Yes, the processing returns to step S401.

According to the present exemplary embodiment, in the case where the digital camera 101 has moved to the outside of the 5G communication range (NO in step S401) or in the case where the digital camera 101 may move to the outside of the 5G communication range (NO in step S404), the digital camera 101 can notify the user that the EN-DC communication will become unavailable. This notification makes it possible to improve usability (user friendliness) of the digital camera (user equipment) 101 having the EN-DC function.

A second exemplary embodiment is described with reference to FIGS. 1 to 3 and FIG. 5. In the first exemplary embodiment, warning is displayed in the predetermined case regardless of whether the digital camera 101 is executing the specific application. In the second exemplary embodiment, it is first determined whether the digital camera 101 is executing a specific data communication application. In a case where the digital camera 101 is executing the application and the EN-DC communication is difficult or unavailable, warning is displayed indicating that the EN-DC communication is difficult or unavailable. The digital camera 101 according to the second exemplary embodiment has the same configuration as that of the digital camera 101 according to the first exemplary embodiment. The network in which the digital camera 101 according to the second exemplary embodiment is used is the same as the network illustrated in FIG. 3. In the following description, the components and the processing/steps same as the components and the processing/steps according to the first exemplary embodiment are denoted by the same reference numerals, and description of parts overlapped with the first exemplary embodiment is appropriately omitted. The digital camera 101 according to the second exemplary embodiment is set so as to transmit a real-time moving image in HD quality to the base stations 302 and 303 when imaging is started.

<Warning Display Processing of EN-DC Communication Difficulty>

Figure 5:
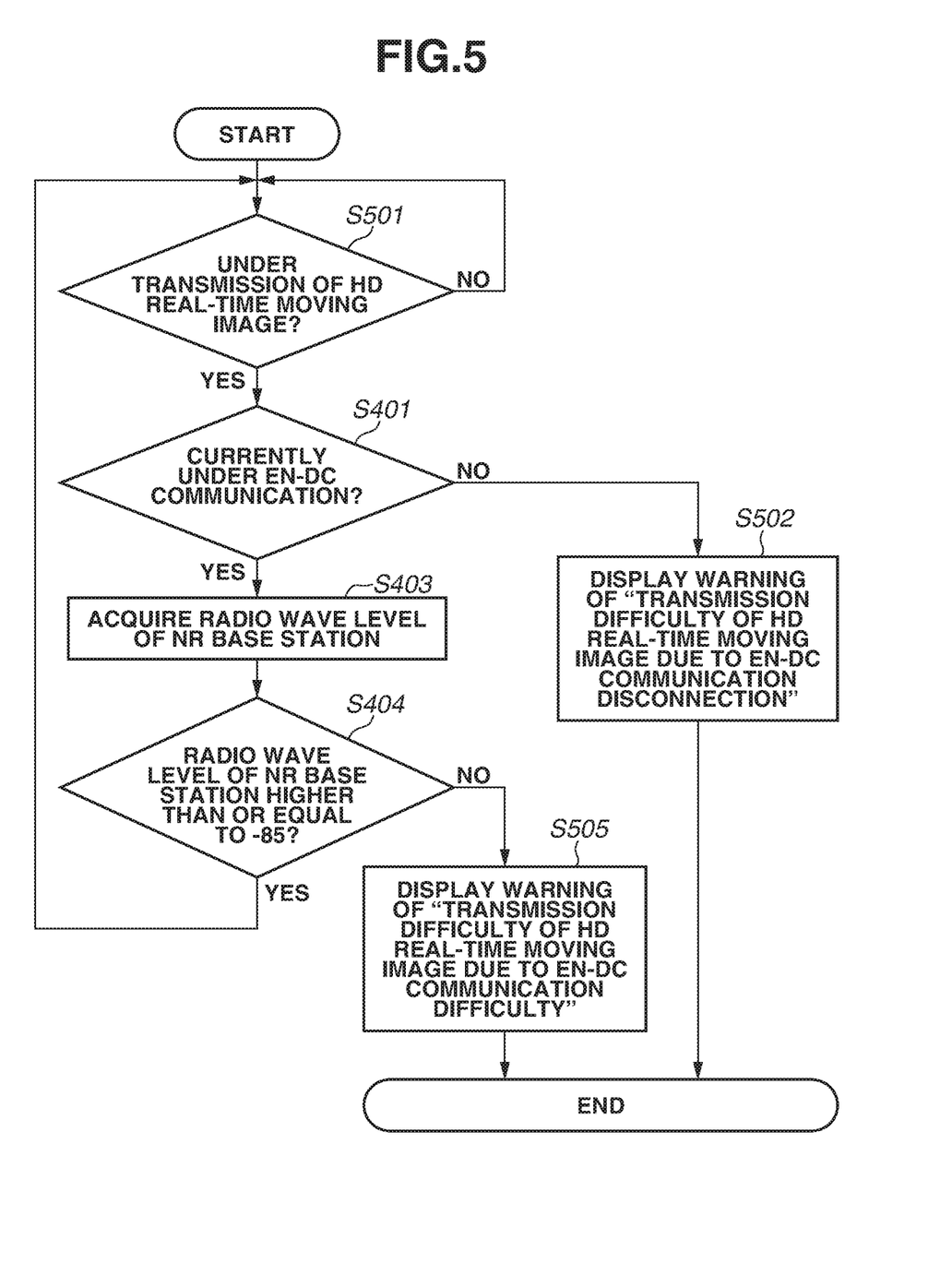
FIG. 5 illustrates an operation flowchart of a communication apparatus according to a second exemplary embodiment of the present disclosure.

FIG. 5 is a flowchart illustrating processing to display EN-DC communication difficulty warning, executed by the digital camera 101 in the second exemplary embodiment.

The flowchart illustrated in FIG. 5 is started by the control unit 102 when the digital camera 101 starts up a real-time moving image transmission application with HD quality as the data communication application. The application determination unit 208 determines whether the application has been started up and is under execution by the digital camera 101. The flowchart illustrated in FIG. 5 is executed when the control unit 102 reads out and executes the computer program stored in the storage unit 103.

In step S501, the digital camera 101 determines whether the wireless communication unit 104 is currently transmitting a HD real-time moving image, based on information acquired from the application determination unit 208. In a case where a result of the determination in step S501 is No (NO in step S501), the processing returns to step S501.

In a case where the result of the determination in step S501 is Yes (YES in step S501), the processing proceeds to step S401. The processing (determination) in step S401 is the same as the processing executed in the first exemplary embodiment.

In a case where a result of the determination in step S401 is No (NO in step S401), the processing proceeds to step S502. In step S502, the digital camera 101 displays warning to notify the user of a situation where "transmission of HD real-time moving image is difficult due to disconnection of EN-DC communication", on the display unit 105 through the display control unit 206. The display unit 105 displays, for example, characters saying "Transmission of HD real-time moving image is difficult." as the warning display. The display unit 105 may output warning sound in step S502. In a case where the result of the determination in step S401 is Yes (YES in step S401), the processing proceeds to step S403. The processing in step S403 is the same as the processing in the first exemplary embodiment. The processing in step S404 subsequent to step S403 is also the same as the processing in the first exemplary embodiment.

In a case where a result of the determination in step S404 is No (NO in step S404), the processing proceeds to step S505. In step S505, the digital camera 101 displays warning to notify the user of a situation where "transmission of HD real-time moving image is difficult due to difficulty of EN-DC communication", on the display unit 105 through the display control unit 206. The display unit 105 displays, for example, characters saying "Transmission of HD real-time moving image is difficult." as the warning display. The display unit 105 may output warning sound in step S505. In this case, the warning sound output in step S502 and the warning sound output in step S505 are preferably made different from each other to enable the user to distinguish the warning sound.

In a case where the result of the determination in step S404 is Yes (YES in step S404), the processing returns to step S501.

According to the present exemplary embodiment, the following effects can be achieved in addition to the effects by the first exemplary embodiment.

The digital camera 101 according to the present exemplary embodiment determines in step S501 whether the predetermined data communication application is under execution. In the case where the data communication application is under execution, the digital camera 101 determines whether the EN-DC communication is under execution. In the case where the data communication application is not under execution, the digital camera 101 does not determine whether the EN-DC communication is under execution. In other words, before the determination processing in step S401 according to the first exemplary embodiment is executed, the digital camera 101 determines whether the determination processing in step S401 is necessary. Since the processing in step S501 is executed before the processing in step S401 as described above is executed, the processing in step S401 is not executed when the processing in step S401 is not necessary. This improves efficiency of the entire processing by the digital camera 101.

<Modifications>

In step S501, the digital camera 101 may determine whether the data communication application that is previously determined to essentially require the cellular network communication is under execution. For example, the digital camera 101 may determine whether the data communication application that remotely operates the digital camera 101 through the cellular network communication is under execution.

In the case where the warning is displayed in step S502 of FIG. 5, the processing immediately ends; however, processing to change the quality of the transmission moving image and to transmit the moving image of the changed quality may be added after step S502. For example, when the user sees the warning display in step S502, the user may want to transmit the moving image by lowering the quality of the moving image. In such a case, for example, a mode of the digital camera 101 may be switched to a mode to automatically switch the quality of the transmission moving image from the HD quality to the SD quality, when predetermined input is input to the digital camera 101 from the user (from outside) through the input unit 106. The digital camera 101 changes the quality of the transmission moving image to the SD quality through the mode switching, and transmits the moving image in the SD quality to the base stations 302 and 303. The processing to change the quality of the transmission moving image to the SD quality is performed by the parameter change unit 209, and the mode switching is performed by the signal transmission unit 202.

Likewise, processing of the quality change and the transmission of the moving image as described above may be added after step S505. In other words, in the case where the predetermined input is input to the digital camera 101 from the user (from outside) via the input unit 106 after step S505, the mode of the digital camera 101 may be switched to the mode to automatically switch the quality of the transmission moving image from the HD quality to the SD quality. The digital camera 101 changes the quality of the transmission moving image to the SD quality through the mode switching, and transmits the moving image in the SD quality to the base stations 302 and 303.

The step to determine whether the digital camera 101 is executing the specific data communication application may be performed not before step S401 illustrated in FIG. 4 but between steps S401 and S403. In a case where such a determination step is performed before step S403 to eliminate necessity of the processing in step S403, the processing in step S403 is not performed. Accordingly, this improves efficiency of the entire processing performed by the digital camera 101.

A third exemplary embodiment is described with reference to FIGS. 1 to 3 and FIG. 6. In the second exemplary embodiment (FIG. 5), in the case where the determination result in step S401 is No, the warning is displayed in step S502 and the processing ends. In the third exemplary embodiment, the other processing (illustrated in steps S601 and S602 in FIG. 6) is performed in place of the processing executed in step S502. In the second exemplary embodiment, in the case where the determination result in step S404 is No, the warning is displayed in step S505 and the processing ends. In the third exemplary embodiment, the other processing (illustrated in steps S603 and S604) is performed in place of the processing executed in step S505.

Figure 6:
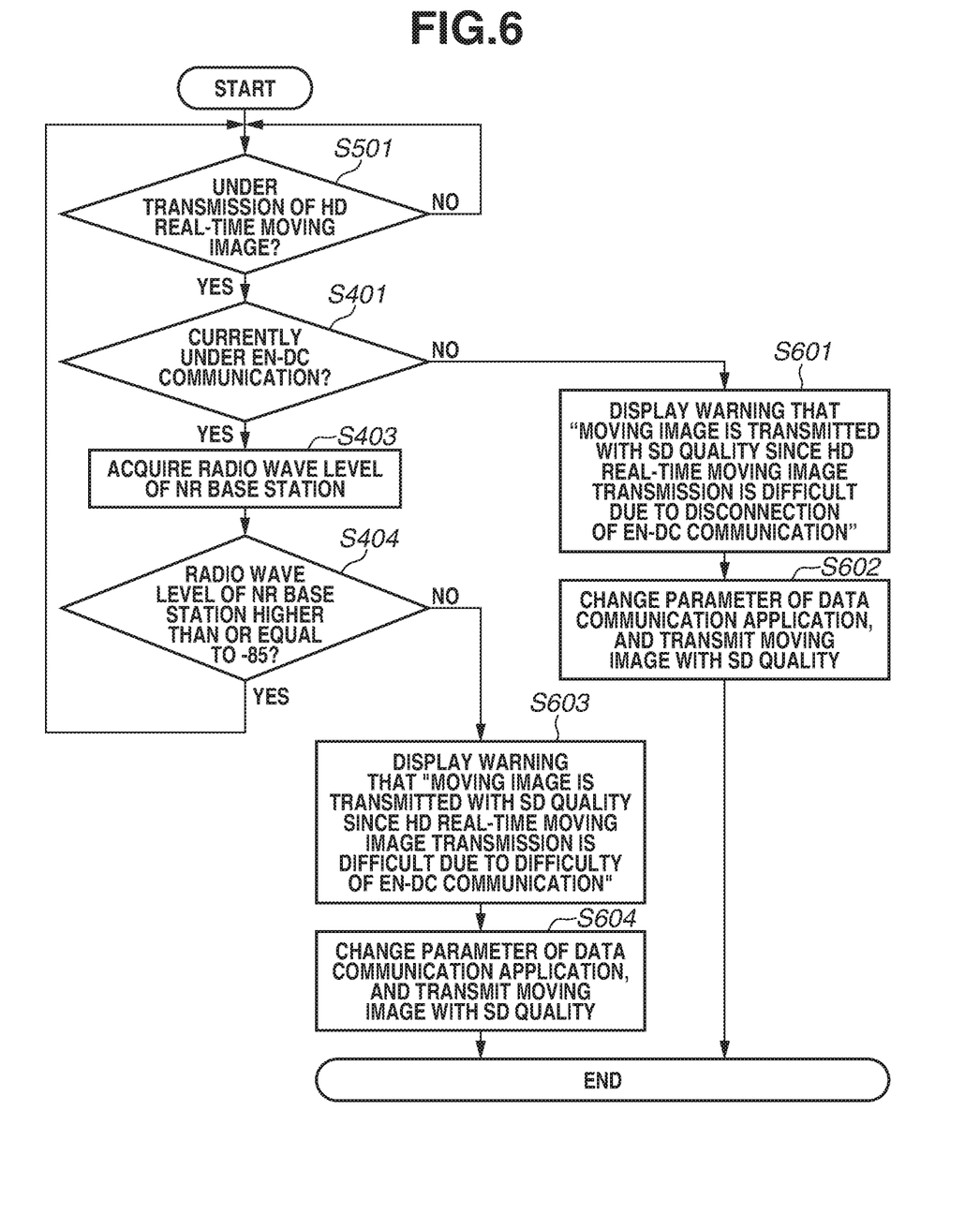
FIG. 6 illustrates an operation flowchart of a communication apparatus according to a third exemplary embodiment of the present disclosure.

It is assumed that, when the parameter change unit 209 changes the parameter of the data communication application, the digital camera 101 can switch the mode from the mode to transmit the moving image in the HD quality to the mode to transmit the moving image in the SD quality. The mode is switched by, for example, the signal transmission unit 202. In the following description, only differences with the second exemplary embodiment are described.

In FIG. 6, in the case where the result of the determination in step S401 is No (NO in step S401), the processing proceeds to step S601. In step S601, the display unit 105 of the digital camera 101 displays warning about quality change of the transmission moving image. The display unit 105 displays, for example, "Moving image is transmitted with SD quality since transmission of HD real-time moving image is difficult due to disconnection of EN-DC communication." as the warning display. After the processing in step S601, the processing proceeds to step S602.

In step S602, the parameter change unit 209 changes the parameter of the data communication application. More specifically, the parameter change unit 209 changes the parameter of the data communication application to transmit not the moving image in the HD quality but the moving image in the SD quality. Thereafter, the digital camera 101 (e.g., signal transmission unit 202) transmits the moving image in the SD quality to the base stations 302 and 303.

In FIG. 6, in the case where the result of the determination in step S404 is No (NO in step S404), the processing proceeds to step S603. In step S603, the display unit 105 of the digital camera 101 displays warning about quality change of the transmission moving image. The display unit 105 displays, for example, "Moving image is transmitted with SD quality since transmission of HD real-time moving image is difficult due to difficulty of EN-DC communication." as the warning display. After the processing in step S603, the processing proceeds to step S604.

In step S604, the same processing as that in step S602 is performed.

In the case where the predetermined input is input to the digital camera 101 from the user via the input unit 106, the mode of the digital camera 101 may be switched to the mode to automatically switch the quality of the transmission moving image from the HD quality to the SD quality. In this case, the digital camera 101 converts the moving image to be transmitted from the HD quality to the SD quality, after the user who has seen a message "Moving image is transmitted with SD quality" displayed in step S601 or S603 performs the predetermined input through the input unit 106. Thereafter, the digital camera 101 transmits the moving image in the SD quality to the base stations 302 and 303.

According to the present exemplary embodiment, the following effects can be achieved in addition to the effects achieved by the second exemplary embodiment.

Since the display unit 105 displays that the moving image to be transmitted is converted from the HD quality to the SD quality, the user can know quality change of the transmission moving image. Thus, this improves convenience of the digital camera 101.

The moving image to be transmitted is converted from the HD quality to the SD quality. Therefore, even in the case where the moving image in the HD quality cannot be transmitted, the moving image in the SD quality can be transmitted to the base stations 302 and 303. In other words, it is possible to avoid a situation where the moving image cannot be transmitted at all.

A fourth exemplary embodiment is described with reference to FIGS. 1 to 3 and FIG. 7. In the first exemplary embodiment (FIG. 4), the processing immediately ends after step S402. However, in the fourth exemplary embodiment, additional processing (illustrated in step S702 in FIG. 7) is performed after step S402. Further, in the first exemplary embodiment, the processing immediately ends after step S405. However, in the fourth exemplary embodiment, additional processing (illustrated in step S705) is performed after step S405. In other words, in the fourth exemplary embodiment, in the case where the EN-DC communication is difficult or unavailable, the state is notified to the user, and EN-DC off setting is requested to the core network 304. The communication system according to the present exemplary embodiment has the same configuration as that of the communication system according to the first exemplary embodiment. The network in which the digital camera 101 according to the fourth exemplary embodiment is used is the same as the network illustrated in FIG. 3. In the following description, the components and the processing/steps same as those according to the first exemplary embodiment are denoted by the same reference numerals, and description of parts overlapped with the first exemplary embodiment is appropriately omitted.

Figure 7:
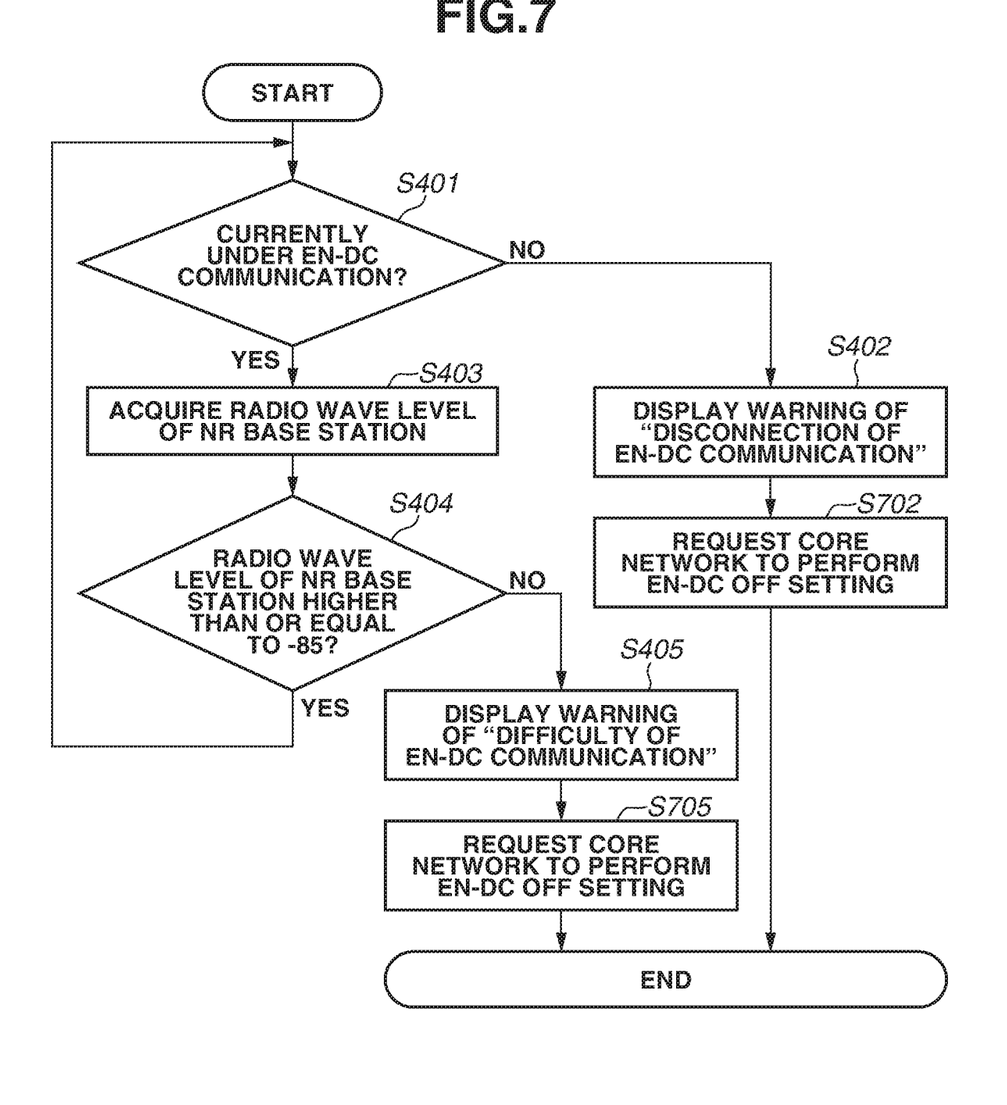
FIG. 7 illustrates an operation flowchart of a communication apparatus according to a fourth exemplary embodiment of the present disclosure.

FIG. 7 is a flowchart illustrating warning display processing of EN-DC communication difficulty, executed by the digital camera 101 in the fourth exemplary embodiment.

In step S702 subsequent to step S402, the digital camera 101 transmits a signal to request EN-DC off setting to the core network 304 through the EN-DC off request unit 210. This makes it possible to prevent retry for EN-DC connection in an environment where the EN-DC communication may be disconnected.

In step S705 subsequent to step S405, the digital camera 101 transmits a signal to request EN-DC off setting to the core network 304 through the EN-DC off request unit 210.

The processing in step S501 may be performed before the processing in step S401.

According to the present exemplary embodiment, the following effects can be achieved in addition to the effects achieved by the first exemplary embodiment.

It is possible to prevent retry for EN-DC connection in the environment where the EN-DC communication is difficult or unavailable. This makes it possible to further improve usability of the digital camera 101.

The digital camera 101 has been described as the example of the communication apparatus in the above-described first to fourth exemplary embodiments; however, the communication apparatus may be other apparatus such as a personal computer (PC), a tablet terminal, a mobile terminal (e.g., smartphone), a projector, and a printer. The LTE and 5G are respectively examples of the first wireless communication method and the second wireless communication method conforming to the 3GPP standard, and methods other than the LTE and 5G may be used. The warning display in the above-described first to fourth exemplary embodiments is an exemplary warning notification to the user. Accordingly, in place of or in addition to the warning display, notification may be performed in a way recognizable by a human, for example, by sound, blinking or lighting of light, or vibration.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-011906, filed Jan. 28, 2019, which is hereby incorporated by reference herein in its entirety.

What is claimed is:

1. A communication apparatus, comprising:
one or more processors; and
one or more memories storing instructions that, when executed by the one or more processors, cause the communication apparatus to act as:
a communication unit configured to perform in parallel a first communication using a first wireless communication method conforming to 3rd generation partnership project (3GPP) standard and a second communication using a second wireless communication method conforming to the 3GPP standard;
an acquisition unit configured to acquire a radio wave state in at least one of the first communication and the second communication while the communication unit performs in parallel the first communication and the second communication;
a notification unit configured to output to a user a warning in a case where the first communication and the second communication are not performable in parallel due to the radio wave state; and
a determination unit configured to determine whether a predetermined data communication application is under execution by the communication apparatus,
wherein, in a case where the determination unit determines that the predetermined data communication application is not under execution, the notification unit does not output to the user the warning.

2. The communication apparatus according to claim 1, wherein the radio wave state includes radio wave intensity in communication with a base station, and
wherein the notification unit notifies the warning in a case where the radio wave intensity is lower than a predetermined threshold.

3. The communication apparatus according to claim 1, wherein, in a case where the determination unit determines that the predetermined data communication application is not under execution, the acquisition unit does not acquire the radio wave state, and in a case where the determination unit determines that the predetermined data communication application is under execution, the acquisition unit acquires the radio wave state.

4. The communication apparatus according to claim 3, wherein the instructions, when executed by the one or more processors, further cause the communication apparatus to act as a change unit configured to change a parameter of the data communication application,
wherein, in a case where the notification unit notifies the warning, the change unit changes the parameter of the data communication application.

5. The communication apparatus according to claim 4, wherein, when the change unit changes the parameter of the data communication application, the notification unit notifies information about change of the parameter.

6. The communication apparatus according to claim 4, wherein the change unit changes the parameter of the data communication application based on an instruction from outside.

7. The communication apparatus according to claim 1, wherein the communication unit performs in parallel the first communication and the second communication using an evolved-universal terrestrial radio access (E-UTRA)-new radio (NR) dual connectivity function.

8. The communication apparatus according to claim 1, wherein the instructions, when executed by the one or more processors, further cause the communication apparatus to act as further comprising a transmission unit configured to transmit a signal to request off-setting of the E-UTRA-NR dual connectivity function to a core network of cellular network communication,
    wherein, in a case where the notification unit notifies the warning, the transmission unit transmits the signal to request the off-setting.

9. The communication apparatus according to claim 1, wherein a first base station is a base station for long term evolution (LTE) communication, and a second base station is a base station for 5th generation mobile communication system (5G) communication.

10. The communication apparatus according to claim 1, wherein the first wireless communication method is a wireless communication method conforming to the LTE, and the second wireless communication method is a wireless communication method conforming to the 5G.

11. The communication apparatus according to claim 1, wherein the communication unit performs in parallel the first communication and the second communication, to upload data to a server through a first base station using the first wireless communication method and a second base station using the second wireless communication method.

12. The communication apparatus according to claim 1, wherein the warning notifies the user that communication is difficult in a case where communication is difficult.

13. The communication apparatus according to claim 1, wherein the warning notifies the user that dual connectivity communication is difficult in a case where dual connectivity communication is difficult.

14. The communication apparatus according to claim 1, wherein the warning notifies the user that communication is unavailable in a case where communication is unavailable.

15. The communication apparatus according to claim 1, wherein the warning notifies the user that dual connectivity communication is unavailable in a case where dual connectivity communication is unavailable.

16. The communication apparatus according to claim 1, wherein the warning notifies the user that communication is disconnected in a case where communication has become disconnected.

17. The communication apparatus according to claim 1, wherein the warning notifies the user that dual connectivity communication is disconnected in a case where dual connectivity communication has become disconnected.

18. The communication apparatus according to claim 1, wherein the warning notifies the user that at least one of real-time moving image communication and high-speed communication is or may be difficult in a case where dual connectivity communication is difficult or has become disconnected.

19. A method of controlling a communication apparatus, the method comprising:
    performing in parallel a first communication using a first wireless communication method conforming to 3GPP standard and a second communication using a second wireless communication method conforming to the 3GPP standard;
    acquiring a radio wave state in at least one of the first communication and the second communication while the first communication and the second communication are performed in parallel;
    outputting to a user a warning in a case where the first communication and the second communication are not performable in parallel due to the radio wave state; and
    determining whether a predetermined data communication application is under execution by the communication apparatus,
    wherein, in a case where the determining determines that the predetermined data communication application is not under execution, the communication apparatus does not output to the user the warning.

20. A non-transitory computer-readable storage medium storing a program to cause a computer to execute a method, the method comprising:
    performing in parallel a first communication using a first wireless communication method conforming to 3GPP standard and a second communication using a second wireless communication method conforming to the 3GPP standard;
    acquiring a radio wave state in at least one of the first communication and the second communication while the first communication and the second communication are performed in parallel;
    outputting to a user a warning in a case where the first communication and the second communication are not performable in parallel due to the radio wave state; and
    determining whether a predetermined data communication application is under execution by the communication apparatus,
    wherein, in a case where the determining determines that the predetermined data communication application is not under execution, the communication apparatus does not output to the user the warning.

* * * * *